(12) United States Patent
Song et al.

(10) Patent No.: US 9,379,557 B2
(45) Date of Patent: Jun. 28, 2016

(54) APPARATUS AND METHOD FOR BATTERY BALANCING

(71) Applicant: SK INNOVATION CO., LTD., Seoul (KR)

(72) Inventors: Woo Seok Song, Daejeon (KR); Sang Hyuk Park, Daejeon (KR)

(73) Assignee: SK INNOVATION CO., LTD. (KR)

( * ) Notice: Subject to any disclaimer, the term of this patent is extended or adjusted under 35 U.S.C. 154(b) by 134 days.

(21) Appl. No.: 14/255,155

(22) Filed: Apr. 17, 2014

(65) Prior Publication Data

US 2014/0312850 A1    Oct. 23, 2014

(30) Foreign Application Priority Data

Apr. 18, 2013 (KR) .................. 10-2013-0043007

(51) Int. Cl.
*H02J 7/00* (2006.01)
*H01M 10/44* (2006.01)
*H01M 10/42* (2006.01)

(52) U.S. Cl.
CPC ......... *H02J 7/0014* (2013.01); *H01M 10/4207* (2013.01); *H01M 10/441* (2013.01)

(58) Field of Classification Search
CPC ............ Y02T 10/7005; Y02T 10/7061; Y02T 10/6221; Y02T 10/7044; Y02T 10/7216; Y02T 10/725; B60L 11/1866; B60L 11/1855; B60L 2240/547; H02J 7/0026; H02J 7/0021; H02J 7/0016; H02J 7/0022; H02J 7/0014; H02J 7/0018; H02J 7/0013; H02J 7/0019; H02J 7/34; H02J 7/35; G01R 31/3637; G01R 31/362
USPC .................................................. 320/127–136
See application file for complete search history.

(56) References Cited

U.S. PATENT DOCUMENTS

| | | | |
|---|---|---|---|
| 2009/0278497 A1 | 11/2009 | Kim | |
| 2011/0025258 A1 | 2/2011 | Kim et al. | |
| 2011/0279085 A1 | 11/2011 | Shigemizu et al. | |
| 2012/0025769 A1* | 2/2012 | Kikuchi | B60L 3/0046 320/118 |
| 2012/0038212 A1 | 2/2012 | Arata et al. | |
| 2012/0104856 A1* | 5/2012 | Gottlieb | H02J 1/10 307/66 |
| 2012/0313439 A1* | 12/2012 | Yamaguchi | H01M 10/425 307/71 |

FOREIGN PATENT DOCUMENTS

KR    1020120135090    12/2012
KR    1020130025561    3/2013

OTHER PUBLICATIONS

European Search Report—European Application No. 141653642 issued on Sep. 18, 2014, citing US 2011/279085, US 2009/278497 and US 2012/038212.

* cited by examiner

*Primary Examiner* — Binh Tat
(74) *Attorney, Agent, or Firm* — Cantor Colburn LLP

(57) ABSTRACT

Provided are an apparatus and a method for battery balancing, and more particularly, to an apparatus and a method for battery balancing capable of implementing balancing between batteries which are connected in parallel.

11 Claims, 6 Drawing Sheets

APPARATUS AND METHOD FOR BATTERY BALANCING

CROSS-REFERENCE TO RELATED APPLICATIONS

This application claims priority under 35 U.S.C. §119 to Korean Patent Application No. 10-2013-0043007, filed on Apr. 18, 2013, in the Korean Intellectual Property Office, the disclosure of which is incorporated herein by reference in its entirety.

TECHNICAL FIELD

The present invention relates to an apparatus and a method for battery balancing, and more particularly, to an apparatus and a method for battery balancing capable of implementing balancing between batteries which are connected in parallel.

BACKGROUND

Generally, an energy storage system, an electric vehicle and the like require a chargeable electricity storage system, in which the electricity storage system includes a plurality of batteries. Each battery has a deviation in capacitance which occurs due to several reasons such as a process for manufacturing a battery.

The battery may be configured and used in a larger form of batteries, such as battery unit cells in a minimum unit, battery modules manufactured in one module form in which the plurality of battery unit cells are connected to each other, battery trays manufactured in a tray form in which the plurality of battery modules are connected to each other, and battery banks manufactured in a larger form by connecting the plurality of battery trays to each other, as needed and may be assigned with various names, but these batteries have the same basic function to store electricity. Further, these batteries may be connected in series, in parallel, or in a serial and parallel mixing structure.

Generally, the electricity storage system in which the batteries are connected in series, in parallel, or in a serial and parallel mixing structure has a voltage unbalance due to different electrochemical characteristics between the respective batteries configuring the electricity storage system.

Therefore, a deviation occurs in charging and discharging voltages of each battery during a charging and discharging cycle of the batteries. Therefore, a specific battery may be overcharged while the battery is charged and a specific battery may also be over discharged while the battery is discharged. As described above, the overcharging or the over discharging of the specific battery among the batteries is a cause which may reduce performance of the battery, deteriorate the battery, and reduce the lifespan of the battery.

Therefore, the battery balancing to control each of the voltage differences between the plurality of cells in the battery to be in a tolerance or the voltages of the plurality of cells to be equal is important and therefore research into a balancing circuit using a voltage and a state of charge (SOC) to remove the voltage unbalance has been prevalently conducted.

US Patent Application Publication No. US-2011-0025258 discloses a system for scheduling charging and discharging of a battery.

RELATED ART DOCUMENT

Patent Document

US Patent Application Publication [US-2011-0025258]

SUMMARY

An exemplary embodiment of the present invention is directed to providing an apparatus and a method for battery balancing when a voltage unbalance between batteries connected in parallel occurs.

In one general aspect, there is provided an apparatus for battery balancing, including: a power conditioning system: a plurality of batteries connected with the power conditioning system in parallel; relays disposed between the power conditioning system and the batteries in series; and a manager connected to the power conditioning system, the batteries, and the relays, respectively and monitoring voltages of each battery, communicating with the power conditioning system when the batteries of which the voltage unbalance is sensed occur, determining the batteries to be balanced among the batteries in which the voltage unbalance is sensed, and determining a balancing mode to control the relays and transmitting a state of the battery to the power conditioning system, wherein the power conditioning system controls a balancing output by communicating with the manager.

When the voltage of the battery does not belong to a predetermined unbalance determination range, the battery may be determined to be the battery of which the voltage unbalance occurs.

In the determination of the balancing mode by the manager, any one selected from a charging mode and a discharging mode for balancing the batteries to be balanced may be determined.

In another general aspect, there is provided a method for battery balancing, including a power conditioning system, batteries, relays, and a manager, the method including: monitoring, by the manager, voltages of each battery in real time; determining, by the manager, an unbalance of the voltages of each battery monitored in the monitoring; determining, by the manager, a battery to be balanced and a balancing mode when the batteries determined as the voltage unbalance in the determining of the voltage unbalance occur; and controlling, by the manager, the relays depending on matters determined in the determining of the balancing and controlling, by the power conditioning system, a balancing output based on information received from the manager by communicating with the manager.

In the determining of the voltage unbalance, when the voltages of the batteries connected in parallel do not belong to an unbalance determination range, the manager may determine the battery as the battery of which the voltage unbalance occurs.

The determining of the balancing may include: determining the batteries to be balanced among the batteries of which the voltage unbalance is sensed; and determining any one selected from a charging mode and a discharging mode for balancing the batteries to be balanced determined in the determining of the balancing object.

In the determining of the balancing object, when the batteries determined as the voltage unbalance are present in plural, a predetermined reference of the battery to be charged may compare with a predetermined reference of the battery to be discharged to determine the balancing object having good efficiency.

The predetermined reference in the determining of the balancing objects may be at least any one selected from number, output, and time.

The controlling of the balancing may include: connecting contacts of the relays connected with the batteries to be balanced in series by controlling the manager; transmitting, by the manager, information of the batteries to be balanced to the power conditioning system; and controlling, by the power conditioning system, a current amount of the charging mode or the discharging mode based on the information received in the transmitting of the battery information.

The controlling of the balancing may include: prior to the connecting of the relays, transmitting, by the manager, battery balancing request information to the power conditioning system; and receiving, by the power conditioning system, the battery balancing request information in the requesting of the balancing and converting power into a predetermined output for preparing balancing.

The controlling of the balancing may include: after the controlling of the balancing output, monitoring, by the manager, a state of each of the batteries to be balanced to determine whether the balancing is completed; and cutting off contacts of the relays connected to the batteries in series determined that the balancing is completed among the batteries to be balanced in the determining whether the balancing is completed, by controlling the manager.

[Detailed Description of Main Elements]

| | |
|---|---|
| 100: BATTERY | 200: RELAY |
| 300: MANAGER | 400: POWER CONDITIONING SYSTEM |
| S10: MONITORING | S20: DETERMINING UNBLANCE |
| S30: DETERMINING BALANCING | S31: DETERMINING BALANCING OBJECT |
| S32: DETERMINING BALANCING MODE | |
| S40: CONTROLLING BALANCING | |
| S41: REQUESTING BALANCING | S42: PREPARING BALANCING |
| S43: CONNECTING RELAY | S44: TRANSMITTING BATTERY INFORMATION |
| S45: CONTROLLING BALANCING OUTPUT | |
| S46: DETERMINING BALANCING COMPLETION | |
| S47: CUTTING OFF RELAY | |

DETAILED DESCRIPTION OF EMBODIMENTS

Hereinafter, an apparatus and a method for battery balancing will be described in detail with reference to the accompanying drawings.

Figure 1:
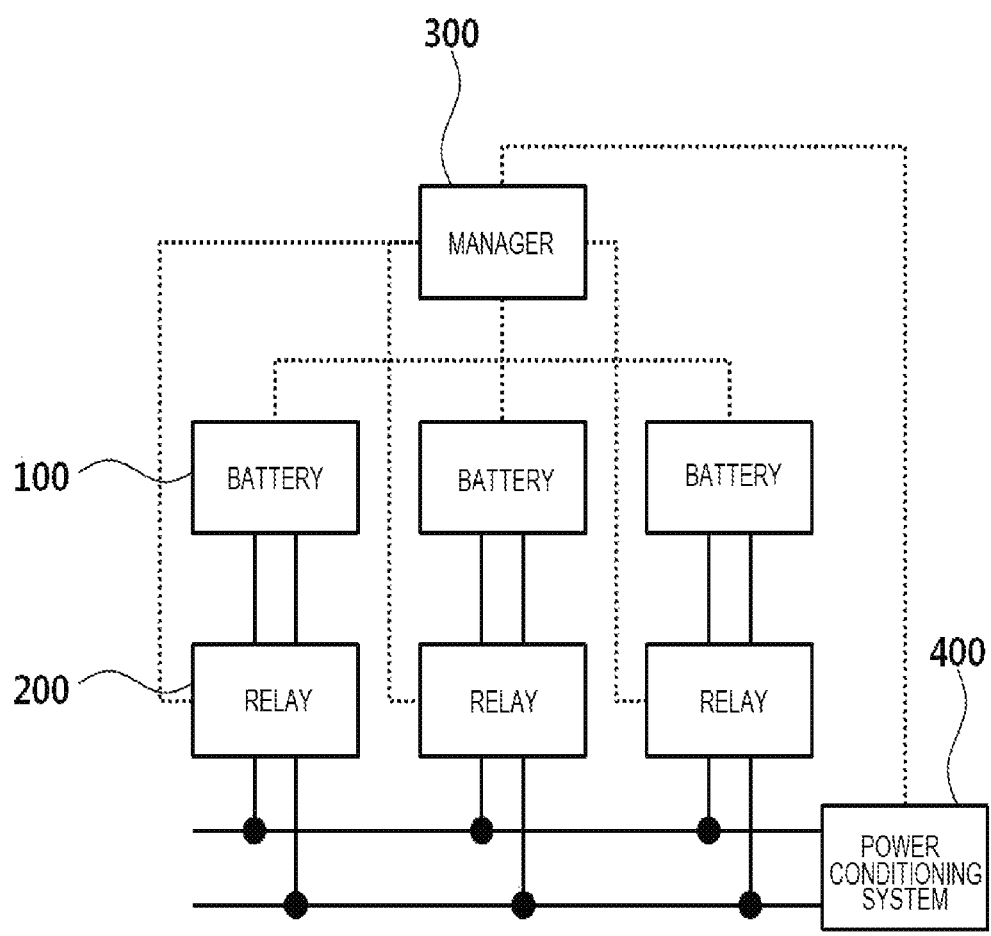
FIG. 1 is a block diagram of an apparatus for battery balancing according to an exemplary embodiment of the present invention.

FIG. 1 is a block diagram of an apparatus for battery balancing according to an exemplary embodiment of the present invention and FIGS. 2 to 6 are flow charts of a method for battery balancing according to an exemplary embodiment of the present invention.

A smart grid means a next-generation intelligent power network which uses an advanced information communication technology (ICT) to exchange real-time information between a power supplier and a consumer in two ways. That is, the smart grid is to increase efficiency, reliability, and stability of the power network and efficiently manage distributed resources by innovating the generation, supply, and operating system of energy using the power network and the advanced ICT (bidirectional communication, sensor, computing, and S/W).

The smart grid is a very wide and comprehensive concept that different kinds of industries, such as communications, Internet, electrics and electronics, vehicle, and software, are fused with a power industry. Further, the smart grid has not yet been standardized all over the world as well as the nations involved. Therefore, under the leadership of power providers and a government, all the countries of the world have enforced a policy on the smart grid which demands for innovation in the power network and various related fields and requires an enormous investment from a long-term point of view.

To stabilize intermittent output characteristics of new renewable energy sources, such as sunlight and wind power, within a short period of time and overcome a time difference between power generation and demand, it is essential to apply an energy storage system (ESS). The battery balancing is one of the important factors to increase efficiency of the energy storage system.

As illustrated in FIG. 1, an apparatus for battery balancing according to an exemplary embodiment of the present invention includes a power conditioning system 400, a battery 100, a relay 200, and a battery manager 300.

The power conditioning system 400 may change and provide power supplied from the outside as needed. The power conditioning system communicates with the manager 300 to help control charging or discharging of the battery.

For example, when a large energy storage system (ESS) of 1 MWh is used in a workplace, power of 22,900 V supplied from Korea Electric Power Corp. may be bucked to 3,300 V by a substation within a workplace and then may be changed to 440 V again by a transformer. Next, 440 V is changed to power of about DC 1,000 V by the power conditioning system (PCS), which may be then stored in a battery. The manager 300 (battery management system (BMS)) may communicate with the power conditioning system (PCS) to control a charging amount and a charging time in consideration of an amount of electricity used currently, a power load and the like depending on a charge amount during the storage process. Next, 1 MWh electricity stored in the energy storage system (ESS) may be delivered to the substation within the workplace to be changed to 3,300 V power again. The substation may supply general electricity supplied from Korea Electric Power Corp. and electricity supplied from the ESS to the overall area of the workplace.

The battery 100 is connected to the power conditioning system in parallel and is configured in plural.

The battery 100 is configured to include a positive terminal and a negative terminal and may be supplied with power from the outside or may deliver the charged power to a load. In this case, the power supplied from the outside may be power, household power (220V), industrial power (380V), and the like which are produced from power plants such as fire power, water power, nuclear power, sunlight, solar heat, wind power, tidal power, and the like.

The battery 100 may be any one selected from a battery unit cell, a battery module, a battery tray, and a battery bank.

The battery module may include a plurality of battery unit cells which include a positive terminal and a negative terminal. In this case, the battery cell units may be connected in series, in parallel, or in a serial and parallel mixing structure.

Further, the battery bank may include a plurality of battery trays. In this case, the battery modules may be connected in series, in parallel, or in a serial and parallel mixing structure.

Further, the battery tray may include a plurality of battery modules. In this case, the battery trays may be connected in series, in parallel, or in a serial and parallel mixing structure.

For example, the plurality of battery trays are connected in parallel and when the balancing between the battery trays is made, the battery tray becomes the battery 100. In this case, the battery modules configuring the battery tray may be connected in any of a serial structure, a parallel structure, or serial and parallel mixing structure.

A relay 200 is disposed between the power conditioning system 400 and the battery 100 in series. In other words, the relay 200 is disposed between the battery 100 and the power conditioning system 400 in series and is disposed to correspond to the number of the battery 100. For example, when 8 batteries 100 are connected in parallel, 8 relays are required to control the battery balancing of each battery 100 Further, it may be determined whether the battery balancing of the corresponding battery 100 is made, based on an operation of the relay 200 which is disposed between the battery 100 and the power conditioning system 400 in series.

Herein, if the relay may control an electrical connection between the battery 100 and a balancing output terminal 10, any relay, such as a contact type relay, a contactless type relay, a positive temperature coefficient (PTC) switching device, and a field effect transistor, may be used.

The manager 300 is connected to the power conditioning system 400, the batteries 100, and the relays 200, respectively, and monitors the voltages of each battery, communicates with the power conversion system 400 when the batteries 100 of which the voltage unbalance is sensed occur, determines the batteries to be balanced among the batteries of which the voltage balance is sensed, and determines a balancing mode to control the relay and transmit a state of the battery 100 to the power conditioning system 400. In this case, the power conditioning system 400 communicates with the battery manager 300 to control the balancing output.

Generally, the manager 300 is connected to a sensor which is connected to the battery 100 to sense various states of the battery 100, serves to keep the voltage of the battery 100 so as not to drop to a predetermined voltage (discharge final voltage) or less based on the information sensed by the sensor and prevent the battery 100 from being charged at a predetermined voltage or more, and generally manages the battery 100, like monitoring and controlling the charge of state (SOC), voltage, current, temperature, and the like of the battery 100. Generally, the battery management system (BMS) is responsible for these functions and in this case, the battery management system becomes the manager 300.

Since characteristics of each battery are not the same, a voltage difference may occur between the batteries connected in parallel due to the continuous charging and discharging. The battery balancing is very important in the lifespan of the battery. For example, when a lithium ion battery is overcharged, most of the active materials of the lithium ion battery react with other materials and an electrolyte, which may potentially lead to damage to the battery or even the explosion of the battery. Further, when the battery is deep-discharged or continuously discharged, the battery may be circuit-shorted despite a terminal voltage below a specific threshold called a cutoff voltage, such that the battery may be changed to an irreversible condition.

When the voltage of the battery 100 does not belong to a previously determined unbalance determination range, the manager 300 may determine the battery as the battery 100 of which the voltage unbalance occurs. In other words, by setting an average or a deviation, such as the battery voltage or the state of charge, to be a determination reference value, a value between a value obtained by adding a predetermined error allowable value to the determination reference value and a value obtained by subtracting a predetermined error allowable value to the determination reference value is set to be an unbalance determination range, and thus the battery deviating from the unbalance determination range may be determined as the battery 100 of which the voltage unbalance occurs.

Further, the manager 300 determines the battery 100 to be balanced among the batteries 100 of which the voltage unbalance is sensed and may determine any one selected from a charging mode and a discharging mode for balancing the battery 100 to be balanced. In other words, all the batteries of which the voltage unbalancing is sensed are not the balancing object. The battery 100 of which the voltage unbalance is sensed may be divided into the battery 100 which exceeds an unbalance determination range upper limit and the battery 100 which is below the unbalance determination range lower limit. Herein, any one selected from the battery 100 which exceeds an unbalance determination range upper limit and the battery 100 which is below the unbalance determination range lower limit may be determined to be the battery 100 to be balanced, such that the number of batteries 100 to be balanced is reduced and thus the number of balancing processes may be reduced, thereby more efficiently performing the balancing. In this case, the output for balancing may be controlled based on any one selected from the voltage, the current, the power, and the state of charge and it is preferable to control a current amount required to charge or discharge the battery 100.

Figure 2:
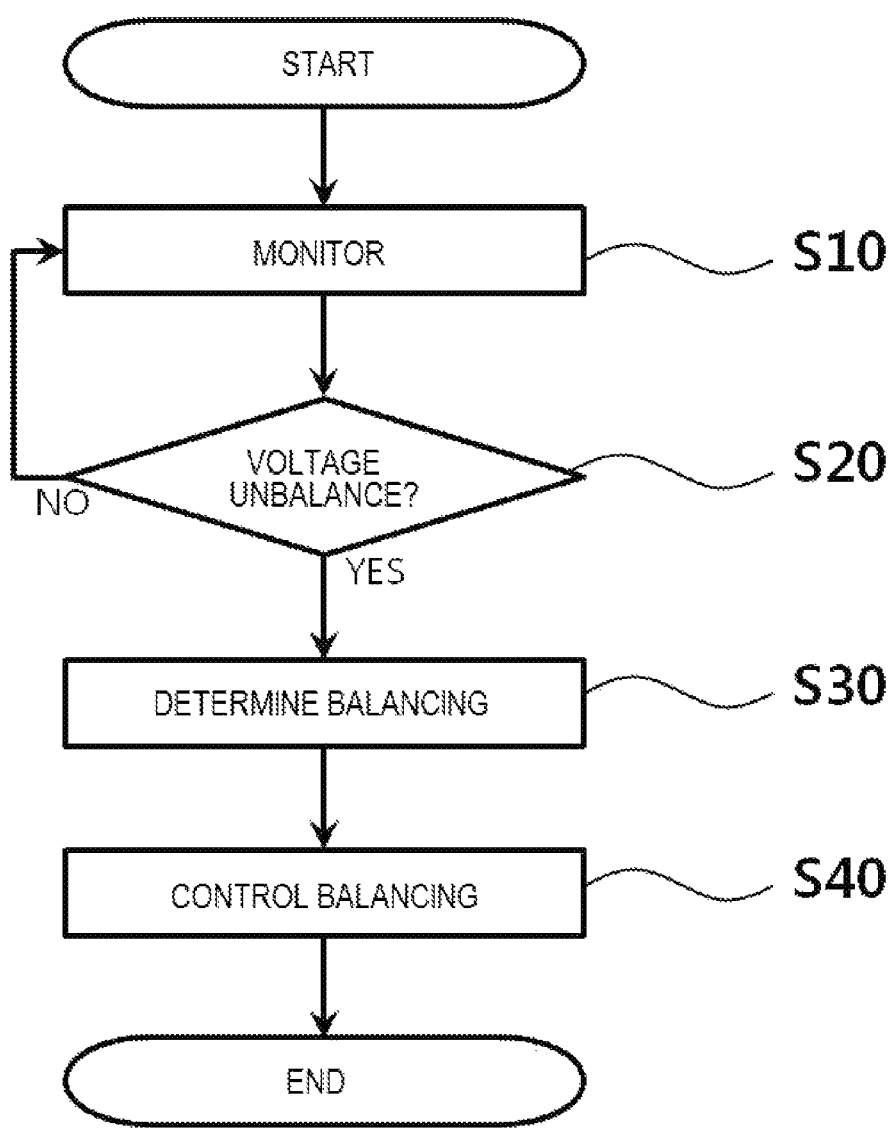
FIGS. 2 to 6 are flow charts of a method for battery balancing according to an exemplary embodiment of the present invention.

As illustrated in FIG. 2, a method for battery balancing according to an exemplary embodiment of the present invention is a method for battery balancing of the battery including the power conditioning system 400, the battery 100, the relay 200, and the manager 300 and includes monitoring (S10), determining the voltage unbalance (S20), determining the balancing (S30), and controlling the balancing (S40).

In the monitoring (S10), the manager 300 monitors the voltages of each battery 100 in real time.

In the determining of the voltage unbalance (S20), the manager 300 determines the voltage unbalance of each battery 100 which are monitored in the monitoring (S10).

In this case, in the determining of the voltage unbalance (S20), the manager 300 may determine the battery of which the voltage unbalance occurs when the voltages of the batteries 100 connected in parallel do not belong to the previously determined unbalance determination range.

In other words, by setting the average or the deviation, such as the battery voltage or the state of charge, to be the determination reference value, the battery deviating from the value between the value obtained by adding a predetermined error allowable value to the determination reference value and the value obtained by subtracting a predetermined error allowable value to the determination reference value may be determined as the battery 100 of which the voltage unbalance occurs. Here, the determination reference value may be calculated by monitoring each battery 100 in real time and the error allowable value may be previously determined and used.

For example, when the average value of voltages of each battery is set to be the determination reference value, if the average value of voltages of each battery is 220V and the predetermined error allowable value is 3V, the unbalance determination range is 217 to 223V. Herein, the deviation is a measure which indicates an error difference of data or an extension of a distribution, and as the deviation, a sum of deviation square, a standard deviation, an average deviation, a quartile deviation, and the like may be used.

In the determining of the balancing (S30), the manager 300 determines the batteries to be balanced and the balancing mode when the battery 100 determined as the voltage unbalance in the determining of the voltage unbalance (S20) occurs.

When the batteries are connected in parallel, various methods, such as a method for charging the battery having a low charging state and a method for discharging the battery having a high charging state, to implement the battery balancing may be used. For example, when there are battery A which is charged by 60% and battery B which is charged by 50%, the battery B is charged and thus becomes a battery charged by 60% to be the same as the battery A. Alternatively, when there are the battery A which is charged by 60% and the battery B which is charged by 50%, the battery A is discharged and thus becomes a battery charged by 50% to be the same as the battery B. Even though the method for discharging a battery is not preferred in energy efficiency, the method for discharging a battery is simply performed and thus may be efficiently used in some cases.

Further, prior to the determining of the battery balancing (S30), all the relays 200 are opened and it is preferable to cut off the electrical connection between the balancing output terminal 10 and the battery 100 so as to stabilize the state of the battery 100.

Figure 3:
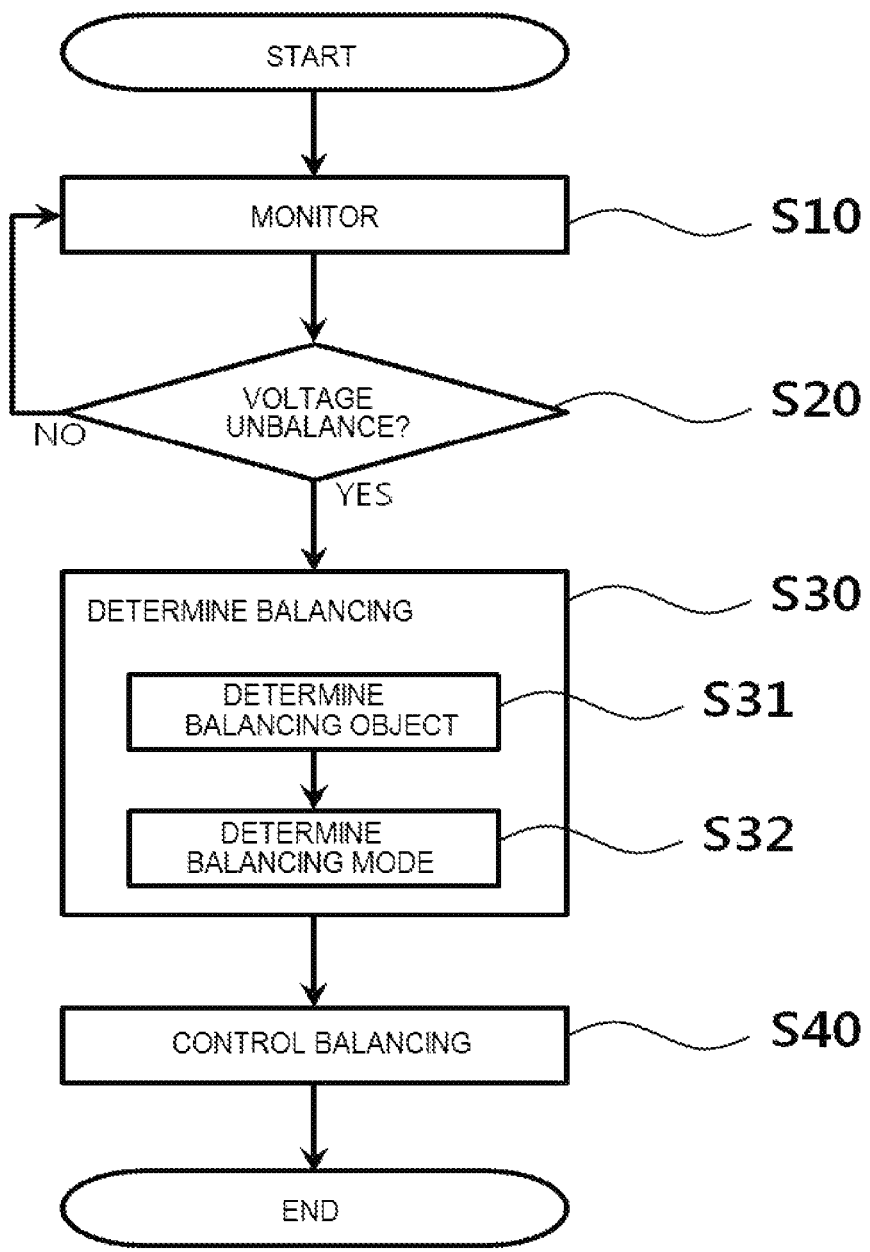

As illustrated in FIG. 3, the determining of the balancing (S30) may include determining the balancing object (S31) and determining the balancing mode (S32).

In the determining of the balancing mode (S31), the battery 100 to be balanced among the batteries of which the voltage unbalance is sensed is determined.

Herein, in the determining of the balancing object (S31), when there are the plurality of batteries 100 determined as the voltage unbalance, the predetermined reference of the battery 100 to be charged may compare with the predetermined reference of the battery to be discharged to determine the balancing object having good efficiency. Herein, in the determining of the balancing object (S31), the predetermined reference may be at least one selected from number, output, and time. In this case, the number means the number of batteries 100, the output means the current amount required for balancing, and the time means time required to complete the balancing. Herein, the output for balancing may be any one selected from voltage, current, and power.

In other words, all the batteries 100 of which the voltage unbalance is sensed are not balanced but any one selected from the battery 100 which exceeds the unbalance determination range and the battery 100 which is below the unbalance determination range among the batteries 100 of which the voltage unbalance is sensed may be determined as the battery 100 to be balanced.

For example, when the average value of voltages of each battery are set to be the determination reference value, 5 batteries are connected in parallel and when the voltages of each battery are 214V, 214V, 220V, 220V, and 232V and the predetermined error allowable value is 5V, the unbalance determination range is 215 to 225V, the number of batteries which exceeds the unbalance determination range is one of 232V, and the number of batteries which is below the unbalance determination range is two of 214V. In this case, when one battery of 232V is discharged and becomes 220V, the unbalance determination range is 212.6 to 222.6 V and thus all the batteries are in the unbalance determination range.

To the contrary, when two batteries of 214V are charged and become 220V, the unbalance determination range is 217.6 to 227.4V and thus one battery of 232V which exceeds the unbalance determination range needs to be balanced again.

In this case, it may be efficient to balance only one battery of 232V.

In the determining of the balancing mode (S32), any one selected from the charging mode and the discharging mode is determined to balance the battery 100 to be balanced determined in the determining of the balancing object (S31).

In the controlling of the balancing (S40), the manager 300 controls the relay 200 according to matters determined in the determining of the balancing (S30) and the power conditioning system 400 communicates with the manager 300 to control the balancing output based on the information received from the manager 300.

If it is determined that the manager 300 monitors the voltage of the battery 100 to complete the balancing, the manager 300 informs the power conditioning system 400 that the balancing is completed, thereby ending the battery balancing.

To stabilize the battery state, the power conditioning system 400 reduces the charging or discharging output if it is determined from the manager 300 that the balancing is completed, and when the output of the power conditioning system 400 is reduced, the manager 300 opens all the relays 200 connected in parallel and then informs the power conditioning system 400 that the balancing is completed, such that the power conditioning system may be changed from a balancing control mode to a control mode prior to the balancing control mode.

Figure 4:
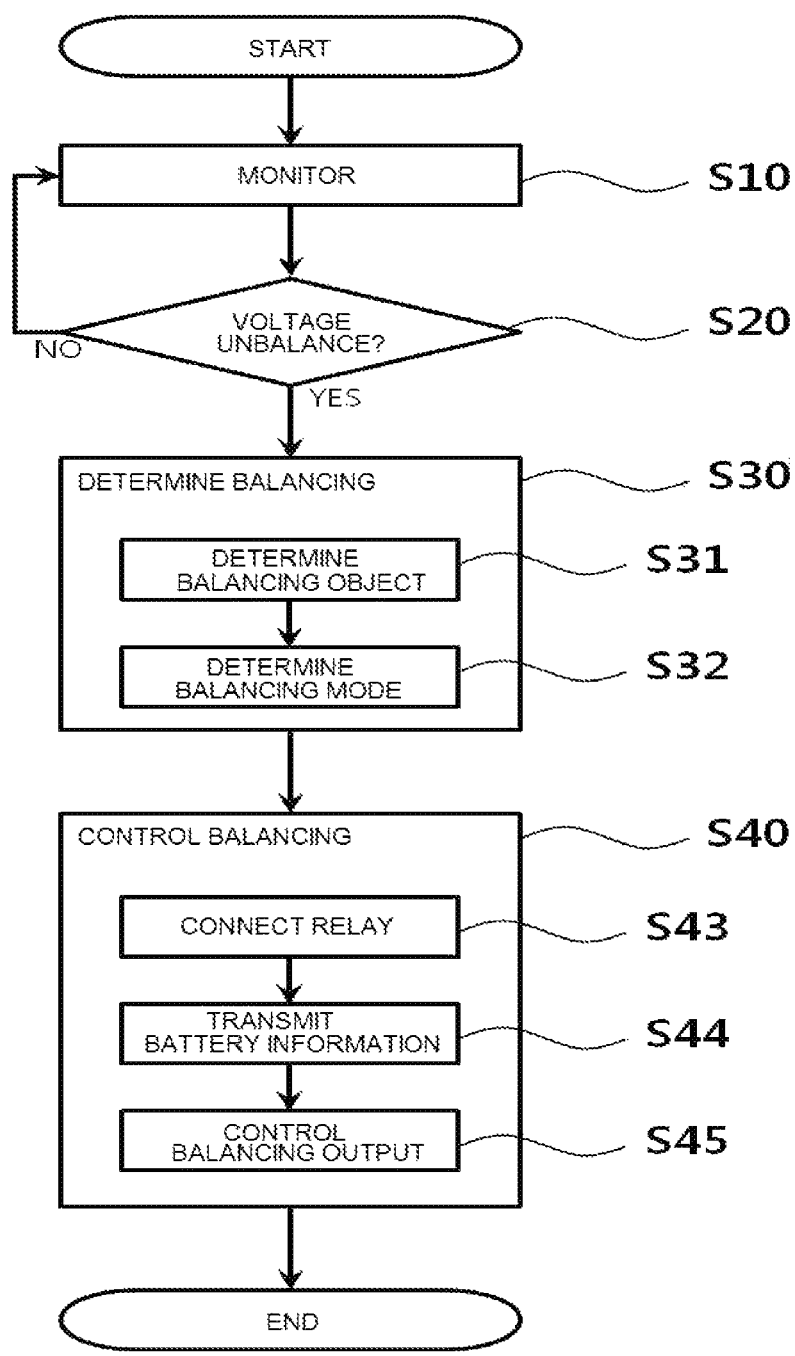

As illustrated in FIG. 4, the controlling of the balancing (S40) may include connecting the relays (S43), transmitting battery information (S44), and controlling balancing output (S45).

In the connecting of the relays (S43), contacts between the relays 200 connected with the batteries 100 to be balanced in series are connected by the control of the manager 300.

In the transmitting of the battery information (S44), the manager 300 transmits the information of the battery 100 to be balanced to the power conditioning system 400.

In the controlling of the balancing output (S45), the power conditioning system 400 controls the current amount of the charging mode or the discharging mode based on the information received from the transmitting of the battery information (S44).

Figure 5:
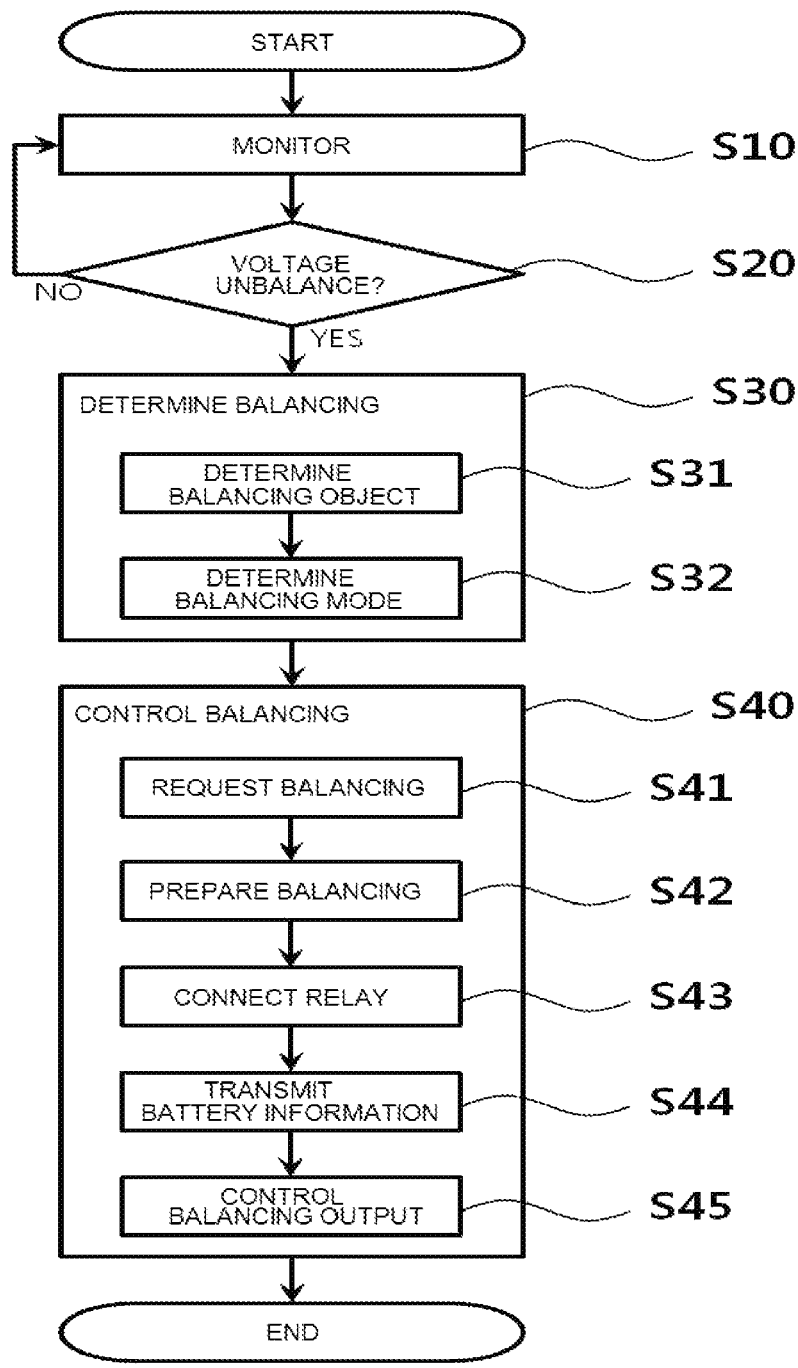

As illustrated in FIG. 5, the controlling of the balancing (S40) may include requesting the balancing (S41) and preparing the balancing (S42), prior to the connecting of the relays (S43).

In the requesting of the balancing (S41), the manager 300 transmits the battery balancing request information to the power conditioning system 400.

In the preparing of the balancing (S42), the power conditioning system 400 receives the battery balancing request information in the requesting of the balancing (S41) and converts power into the predetermined output so as to prepare the balancing.

In other words, the output (charging or discharging) which is generally used is an output which is used in the state in which all the batteries are connected and if the output generally used is applied by connecting only the relays connected to the batteries to be balanced, an excessive amount of current may flow. Therefore, to prevent the excessive amount of current from flowing due to the attachment of the electrical contacts between the relays 200, the power conditioning system 400 is to change power to the predetermined output for battery balancing.

Figure 6:
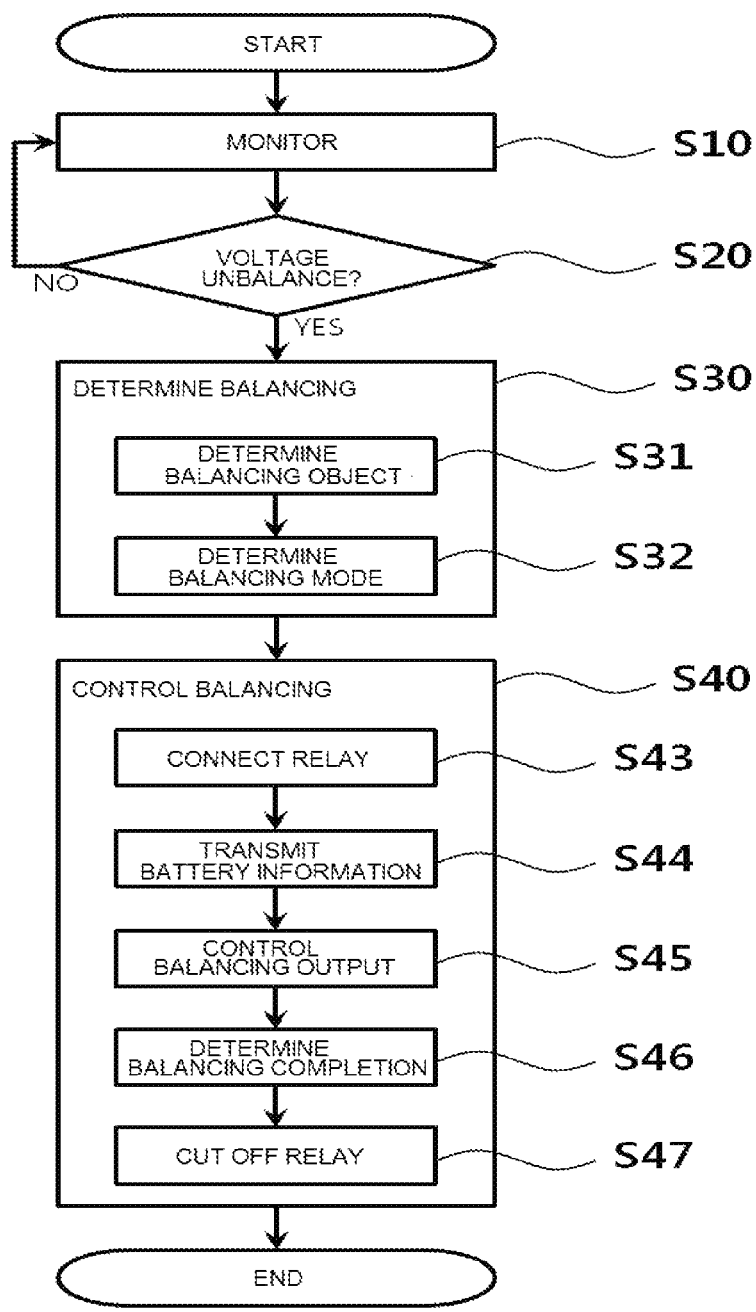

As illustrated in FIG. 6, the controlling of the balancing (S40) may include determining the balancing completion (S46) and cutting off the relay (S47), after the controlling of the balancing output (S45).

In the determining of the balancing completion (S46), the manager 300 monitors the states of each battery 100 to be balanced to determine whether the balancing is completed.

In the cutting off of the relay (S47), the contacts between the relays serially connected to the batteries determined that the balancing is completed among the batteries to be balanced in the determining of the balancing completion (S46) are cut off by controlling the manager 300.

In other words, when the plurality of batteries are balanced, since the difference in the balanced degree and time for each battery occurs, it is preferable to rule out the balanced battery from the balancing object during the balancing process.

According to the apparatus and method for battery balancing in accordance with the exemplary embodiments of the present invention, when the voltage unbalance between the batteries connected in parallel occurs, the battery balancing is performed by charging or discharging the battery of which the voltage unbalance occurs, thereby preventing the battery from deteriorating, to increase the stability of the battery, extending the lifespan of the battery, and saving the maintenance costs of the battery.

The present invention is not limited the foregoing embodiments, but applications thereof may be various, and may be variously changed without departing from the scope of the present invention.

What is claimed is:

1. An apparatus for battery balancing, comprising:
a power conditioning system:
a plurality of batteries connected with the power conditioning system in parallel;
relays disposed between the power conditioning system and the batteries in series; and
a manager connected to the power conditioning system, the batteries, and the relays, respectively and monitoring voltages of each battery, communicating with the power conditioning system when the batteries of which the voltage unbalance is sensed occur, determining the batteries to be balanced among the batteries of which the voltage unbalance is sensed, and determining a balancing mode to control the relays and transmitting a state of the battery to the power conditioning system,
wherein the power conditioning system is configured to convert power into a predetermined output for battery balancing when receiving balancing request information by communicating with the manager.

2. The apparatus of claim 1, wherein when the voltage of the battery does not belong to a predetermined unbalance determination range, the battery is determined to be the battery of which the voltage unbalance occurs.

3. The apparatus of claim 1, wherein in the determination of the balancing mode by the manager, any one selected from a charging mode and a discharging mode for balancing the batteries to be balanced is determined.

4. A method for battery balancing, including a power conditioning system, batteries, relays, and a manager, the method comprising:
monitoring, by the manager, voltages of each battery in real time;
determining, by the manager, an unbalance of the voltages of each battery monitored in the monitoring;
determining, by the manager, a battery to be balanced and a balancing mode when the batteries determined as the voltage unbalance in the determining of the voltage unbalance occur; and
controlling, by the manager, the relays depending on matters determined in the determining of the balancing and controlling, by the power conditioning system, a balancing output based on information received from the manager by communicating with the manager,
wherein the controlling of the balancing output comprises:
converting power into a predetermined output for battery balancing when the power conditioning system receives balancing request information by communicating with the manager.

5. The method of claim 4, wherein in the determining of the voltage unbalance, when the voltages of the batteries connected in parallel do not belong to an unbalance determination range, the manger determines the battery as the battery of which the voltage unbalance occurs.

6. The method of claim 4, wherein the determining of the balancing includes:
determining the batteries to be balanced among the batteries of which the voltage unbalance is sensed; and
determining any one selected from a charging mode and a discharging mode for balancing the batteries to be balanced determined in the determining of the balancing object.

7. The method of claim 6, wherein in the determining of the balancing object, when the batteries determined as the voltage unbalance are present in plural, a predetermined reference of the battery to be charged compares with a predetermined reference of the battery to be discharged to determine the balancing object having good efficiency.

8. The method of claim 7, wherein the predetermined reference in the determining of the balancing object is at least any one selected from number, output, and time.

9. The method of claim 4, wherein the controlling of the balancing includes:
connecting contacts of the relays connected with the batteries to be balanced in series by controlling the manager;
transmitting, by the manager, information of the batteries to be balanced to the power conditioning system; and
controlling, by the power conditioning system, a current amount of the charging mode or the discharging mode based on the information received in the transmitting of the battery information.

10. The method of claim 9, wherein the controlling of the balancing includes:
prior to the connecting of the relays,
transmitting, by the manager, battery balancing request information to the power conditioning system; and
receiving, by the power conditioning system, the battery balancing request information in the requesting of the balancing and converting power into a predetermined output for preparing balancing.

11. The method of claim 9, wherein the controlling of the balancing includes:
after the controlling of the balancing output,
monitoring, by the manager, a state of each of the batteries to be balanced to determine whether the balancing is completed; and
cutting off contacts of the relays connected to the batteries in series determined that the balancing is completed among the batteries to be balanced in the determining whether the balancing is completed, by controlling the manager.

* * * * *